United States Patent
Seyedi

(10) Patent No.: US 11,860,509 B2
(45) Date of Patent: Jan. 2, 2024

(54) OPTICAL LOGIC GATE DECISION-MAKING CIRCUIT COMBINING NON-LINEAR MATERIALS ON SOI

(71) Applicant: HEWLETT PACKARD ENTERPRISE DEVELOPMENT LP, Houston, TX (US)

(72) Inventor: Mir Ashkan Seyedi, Milpitas, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 46 days.

(21) Appl. No.: 17/505,486

(22) Filed: Oct. 19, 2021

(65) Prior Publication Data

US 2023/0118909 A1 Apr. 20, 2023

(51) Int. Cl.
*G02F 3/00* (2006.01)
*G02B 6/12* (2006.01)
(Continued)

(52) U.S. Cl.
CPC ............. *G02F 3/00* (2013.01); *G02B 6/12* (2013.01); *G02B 6/12007* (2013.01);
(Continued)

(58) Field of Classification Search
CPC ........ G02F 3/00; G02F 1/0113; G02F 1/0147; G02F 1/025; G02F 1/3515; G02F 3/024;
(Continued)

(56) References Cited

U.S. PATENT DOCUMENTS 6,947,632 B2 * 9/2005 Fischer .................. G02F 1/035
385/32

FOREIGN PATENT DOCUMENTS

CN 102062988 B * 10/2012
CN 204129402 U * 1/2015
(Continued)

OTHER PUBLICATIONS

Mohebbi et al. ("All-optical simultaneous AND & XOR logic gates based on nonlinear micro-ring resonator", Journal of Modern Optics, 2018, vol. 65, No. 21, 2326-2331). (Year: 2018).*
(Continued)

*Primary Examiner* — Michelle R Connelly
(74) *Attorney, Agent, or Firm* — Sheppard Mullin Richter & Hampton LLP

(57) ABSTRACT

An optical logic gate decision-making circuit that combines non-linear materials, such as silicon nitride, on a silicon-on-insulator (SOI) substrate is described. Circuitry includes a ring cavity coupled to an input optical bus waveguide. The input optical bus waveguide receives an optical signal and passes the optical signal to the ring cavity. An electro-optical device, for instance a PN junction, is integrated within the ring cavity to modulate the optical signal such that an optical logic gate function is enabled. An output optical bus waveguide is also coupled to the ring cavity, which outputs the optical signal modified based on the optical logic gate function and based on a wavelength routing function. By using silicon nitride, the optical non-linearity of the materials enables an "all-optical" logic gate. Thus, the optical logic gate decision-making circuit is suitable for all-optical circuits, and support ultrafast optical signal processing and enabling packet switching of data.

8 Claims, 5 Drawing Sheets

(51) Int. Cl.
*G02F 1/01* (2006.01)
*G02F 1/025* (2006.01)
*G02F 3/02* (2006.01)
*G02F 1/35* (2006.01)
*G02B 6/293* (2006.01)
*G02B 6/42* (2006.01)
*G02B 6/28* (2006.01)

(52) U.S. Cl.
CPC ........ *G02B 6/29338* (2013.01); *G02F 1/0113* (2021.01); *G02F 1/0147* (2013.01); *G02F 1/025* (2013.01); *G02F 1/3515* (2013.01); *G02F 3/024* (2013.01); *G02B 6/28* (2013.01); *G02B 6/4266* (2013.01); *G02B 2006/12061* (2013.01)

(58) Field of Classification Search
CPC .. G02B 6/12; G02B 6/12007; G02B 6/29338; G02B 6/28; G02B 6/4266; G02B 2006/12061
See application file for complete search history.

(56) References Cited

FOREIGN PATENT DOCUMENTS

| | | | | |
|---|---|---|---|---|
| CN | 204129403 U | * | 1/2015 | |
| CN | 104793428 A | * | 7/2015 | |
| WO | WO-2016182537 A1 | * | 11/2016 | ......... G02B 6/12004 |

OTHER PUBLICATIONS

Salmanpour et al. ("All-optical photonic crystal AND, XOR, and OR logic gates using nonlinear Kerr effect and ring resonators", Journal of Modern Optics, 2015, vol. 62, Nos. 8-9, 693-700). (Year: 2015).*

Tian et al., Machine Translation of CN-102062988-B, Oct. 2012. (Year: 2012).*

Guo et al., Machine Translation of CN-204129402-U, Jan. 2015. (Year: 2015).*

Guo et al., Machine Translation of CN-204129403-U, Jan. 2015. (Year: 2015).*

Chen et al., Machine Translation of CN-104793428-A, Jul. 2015. (Year: 2015).*

* cited by examiner

| $\lambda_1$ 410 | $\lambda_2$ 420 | Logic Gate THRU 430 | Logic Gate DROP 440 | Output 1 450 | Output 2 460 |
|---|---|---|---|---|---|
| 0 411 | 0 421 | 0 431 | 0 441 | 0 451 | $\lambda_2$ 461 |
| 0 412 | 1 422 | 0 432 | 1 442 | $\lambda_2$ 452 | 0 462 |
| 1 413 | 0 423 | 0 433 | 1 443 | $\lambda_2$ 453 | 0 463 |
| 1 414 | 1 424 | 1 434 | 0 444 | 0 454 | $\lambda_2$ 464 |

OPTICAL LOGIC GATE DECISION-MAKING CIRCUIT COMBINING NON-LINEAR MATERIALS ON SOI

BACKGROUND

Decision-making circuits (or decision circuits) are a basic component of digital computing. Decision circuits are configured to decide whether an incoming binary signal is at the logical "0" level or at the logical "1" level by sampling the received signal and comparing the sample value to a threshold level (e.g., Vth). Thus, as a building block to more sophisticated circuitry, the accuracy and efficiency of decision circuits can further impact the overall performance of the more complex control and/or calculation functions that are dependent on these basic logical decisions. As a consequence, it may be desirable to implement decision-making circuits in a manner that improves efficiency, reduces latency, and improves integration with emerging technologies, such as optical technology.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4 shows a truth table representing examples of the logical operations performed by the optical logic decision-making circuit shown in FIG. 3, in accordance with the disclosure.

Figure 1:
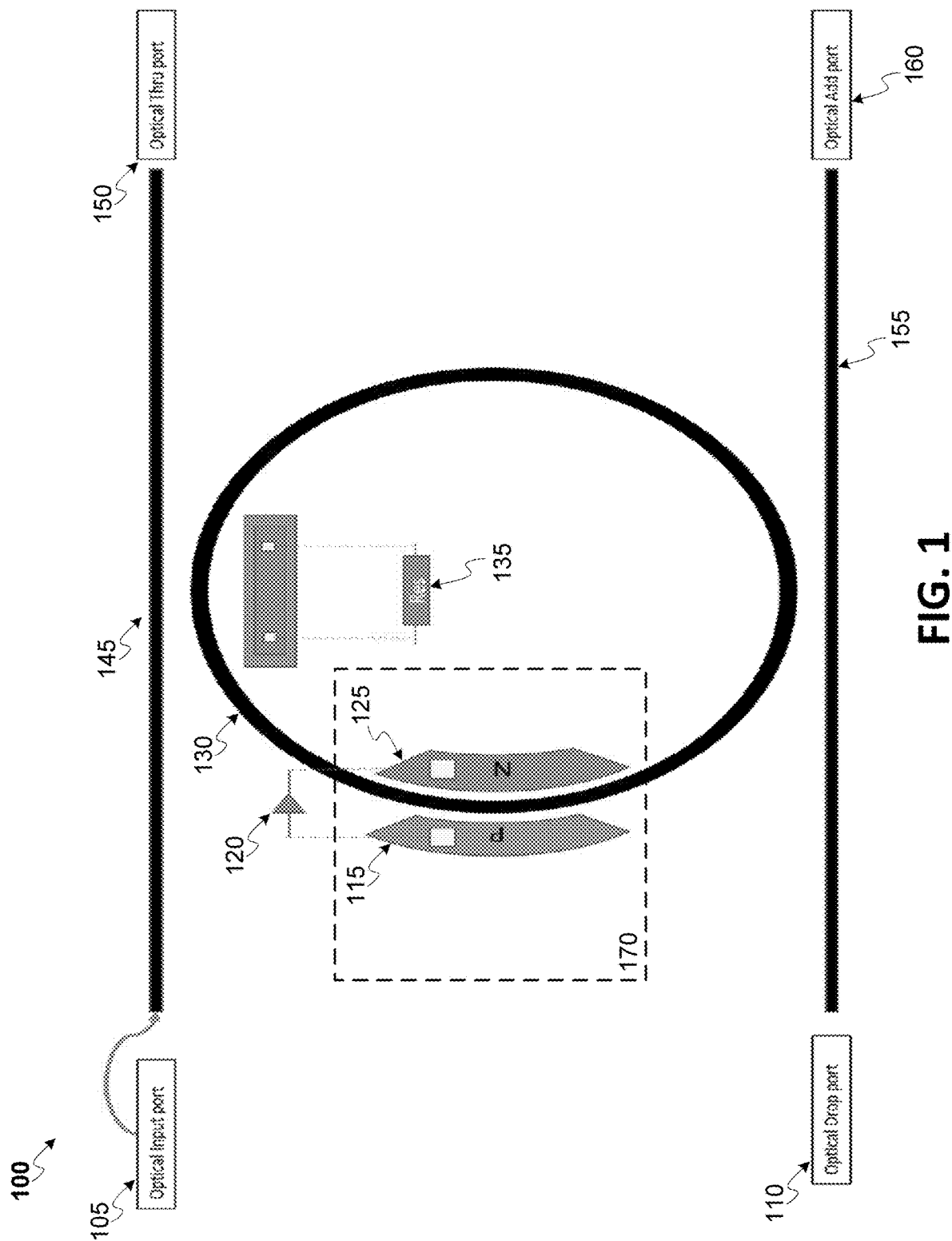
FIG. 1 depicts a schematic of an example silicon-based ring cavity filter that can be integrated with an optical logic gate, in accordance with the disclosure.

The figures are not exhaustive and do not limit the present disclosure to the precise form disclosed.

DETAILED DESCRIPTION

Today the demand for high bandwidth has rapidly increased as a means to better utilize the speed capabilities of many electronic devices. Thus, in an aim to increase bandwidth, there is an emergence of technologies that seek to implement "all-optical" logic gates that can function at high bit-rates. However, in optical signal processing, digital gates can have complicated and cumbersome electro-optic conversion. As a consequence, in order to achieve optimal "all-optical" systems, it may also be necessary to also achieve an "all-optical" configuration at the component level. In other words, the functions which are often performed in optical networks, such as add-drop multiplexer, packet synchronization, clock recovery, address recognition, and signal regeneration, and so forth should also be realized using "all-optical" elements, in order to achieve a true "all-optical" system.

For example, decision-making circuits may be a type of core circuitry that can benefit from the successfully implemented of an "all-optical" element, namely an "all-optical" logic gate. Conventionally, decision-making circuits require, at minimum, an optical-to-electrical (O/E) transition to allow electronic digital logic circuits to make a decision on how to configure the downstream data path. These are inherently latent and limited to the processor clock cycle frequency, on the order of hundreds of picoseconds to single nanoseconds, for example. Furthermore, electronic digital logic circuits are inefficient due to the required translating O/E and re-encoding the electrical data back into the optical domain. Because of this latency and optical-to-electrical-to-optical (O/E/O) conversion, it is very difficult to synchronize such decision-making circuits with the otherwise high-speed optical data signal. For example, optical data signals can run with an example range of 25-100 Gbps, and with bit lengths on the order of tens of picoseconds or smaller, for example. By implementing an "all-optical" decision-making circuit, decisions can be synchronized on the same clock cycle and time scale as the optical data itself, enabling packet switching of data in a practical manner, without requiring buffers for the data.

As alluded to above, in order to develop "all-optical" circuits, such as "all-optical" decision-making circuits, the challenge of "all-optical" gates must be addressed. "All-optical" logic gates may be considered the core logic units to implement various all-optical systems for optical signal processing, as gates are the key elements to realize all-optical functions. To design optical gates, it is necessary to implement a non-linear medium which modulates the signal to produce the desired results. The non-linearity may be generated in numerous ways, such as using a non-linear loop mirror, a non-linear fiber, a photonic crystal, a filter, a waveguide, a thyristor, acoustic waves, or a semiconductor optical amplifier.

The optical logic gate decision-making circuit, as disclosed herein, is implemented as an "all-optical" design by utilizing optical non-linear effects on a combined silicon nitride on silicon-on-insulator (SOI) wafer platform. Restated, the embodiments distinctly combine a wafer platform for nitride on silicon-on-insulator to be used in conjunction with traditional silicon-based devices to enable the optical logical gates. Thus, an "all-optical" circuit can be used for various applications, such as switch-less decision-making trees, and optical computing/logic, in a manner which ultimately relieves bottlenecks in data movement. Additionally, the disclosed optical logic gate decision-making circuit can non-destructively use two separate optical input signals to make decisions on a third optical data signal.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

As referred to herein, the term "logical" involves a calculating/or solving an expression including an operator as a symbol (or word) that connects two or more input values or expressions, such that the result value of the compound expression produced depends only on that of the original expressions and on the meaning of the operator. Common logical operators include AND, OR, XOR and NOT. Logical operators and expression discussed herein perform their corresponding logical functions as well-known in the art.

In FIG. 1, a schematic of an example silicon-based ring cavity filter 100 that can be integrated with an optical logic gate is shown. As a general description, the disclosed embodiments combine the capabilities of an optical logic gate and the wavelength-routing capabilities of a silicon-based ring cavity, for instance the silicon-based ring cavity filter 100 of FIG. 1, in order to create a time-based decision-making circuit for optical packet routing.

The example silicon-based ring cavity filter 100 (also referred to as an optical ring resonator) is depicted as a four-port ring resonator cavity in FIG. 1. In particular, the silicon-based ring cavity filter 100 includes an optical input port 105, an optical drop port 110, an optical thru port 150, and an optical add port 160. The silicon-based ring cavity filter 100 can include a primarily circular-shaped waveguide, oval-shaped waveguide, or other suitably-shaped closed-loop waveguide that forms a ring cavity 130. The ring cavity 130 is coupled to two separate primarily linear-shaped bus waveguides 145 and 155. Each of the two optical bus waveguides 145, 155 having opposing end-points used to implement the optical input port 105, optical thru port 150, optical drop port 110, and optical add port 160, respectively. As seen in FIG. 1, the waveguide 145 has the optical input port 105 situated at a first end (left side of FIG. 1) and the optical thru port 150 situated at a second end (that is distal from to the first end, right side of FIG. 1). The optical bus waveguide 155 has the optical drop port 110 situated at a first end (left side of FIG. 1) and the optical add port 160 situated at a second end (that is distal with respect to the first end, right side of FIG. 1). In operation, when light of the resonant wavelength is passed through the loop of the ring cavity 130 from the optical bus waveguide 145 (acting as an input waveguide), it builds up in intensity over multiple round-trips due to constructive interference and is output to the optical bus waveguide 155 (acting as an output bus waveguide) which also serves as a detector waveguide. Thus, selective wavelength filtering is enabled using the silicon-based ring cavity filter 100 by using these optical ports 105, 110, 150, 160 and the resonance behavior of the ring cavity 130. For example, certain wavelengths can be selectively routed to the optical drop port 110 from the optical input port 105, while the other wavelengths (e.g., wavelengths not selected/not resonant with the ring cavity 130) pass unimpeded to the optical thru port 150. Similarly, on-resonance wavelengths that are injected into the optical add port 160 are routed through the ring cavity 130 and to the optical thru port 150, while the remaining wavelengths pass unimpeded to the optical drop port 110. Thus, the silicon-based ring cavity filter 100 modifies an optical signal based on these aforementioned wavelength routing functions, and based on the optical logic gate function, described in further detail below. For instance, the silicon-based ring cavity filter 100 outputs an optical signal that is resonant with the ring cavity 130 via the output to the optical bus waveguide 155 (acting as an output bus waveguide) in accordance with its wavelength routing capabilities; and modifies the optical signal to execute exclusive OR (XOR) logic gate functions (as observed at the drop port 110) in accordance with the optical logic gate capabilities.

Also shown, is an electrically resistive element 135 that is integrated inside of the ring cavity 130 to facilitate thermal-based tuning of the wavelength of resonance by increasing local temperature and index of refraction (also referred to herein as the thermal tuner 135). As seen in the example of FIG. 1, an electro-optical device 170 is also integrated into the ring cavity 130 to further enable high-speed modulation for the optical signal. The electro-optical device 170 can be implemented as a PN junction, PIN junction, or thermal resistor, or any suitable element that comprising the materials necessary to change the local index of refraction of the silicon material. In the example of FIG. 1, the electro-optical device 170 is particularly shown as a PN junction. As referred to herein, a PN junction, can be considered as an interface between two different types of materials called p-type and n-type semiconductors. These materials are formed by the deliberate addition of impurities to pure semiconductor materials, such as silicon. The PN junction 170 (indicated by dashed-line box) comprises a p-type material 115 side of the junction, which is positioned outside of the ring cavity 130 and an n-type material 125 side of the junction positioned inside of the ring cavity 130. The p-type material 115 and n-type material 125 are both coupled to photodetector diode 120. According to the embodiments, the silicon-based ring cavity filter 100 is implemented in silicon, for numerous reasons. One such reason for the use of silicon is to take advantage of the electrical integration. Furthermore, silicon is also a stable material as its index of refraction shows a weak response to high optical field intensities.

In some embodiments, the silicon-based ring cavity filter 100 can be implemented in silicon nitride. Silicon nitride is a material that can have a higher response to optical field intensities. Thus, by implementing the silicon-based ring cavity filter 100 using silicon nitride, one can take advantage of the optical non-linearity of the material. This non-linearity effect can be characterized in a change of the optical index of refraction from the magnitude of the optical intensity; specifically, the electric field of the optical electromagnetic wave. By exploiting this non-linearity effect that is associated with the silicon-based ring cavity filter 100 based in silicon nitride, an optical logic gate can be created. As previously described, "all-optical" logic gates, which are responsible for various logical operations in all-optical circuits, can play a key role in ultrafast optical signal processing. Thus, it is of high relevance to leverage the disclosed silicon-based ring cavity filter 100 to realize fast, energy-efficient, and reliable "all-optical" logic gates, in accordance with the disclosed techniques.

Although the disclosure is described using materials such as silicon nitride, for the fabrication of circuits and/or material stack, these examples are not intended to be limiting. That is, other forms of conductive and non-linear materials may be used for constructing the disclosed circuitry. For instance, amorphous silicon may be used to implement the optical logic gate decision-making circuit, as disclosed herein. The materials used and the performance of the circuitry is ultimately a function of various design related characteristics, such as non-linear performance, losses, foundry process tools, and cost.

Figure 2:
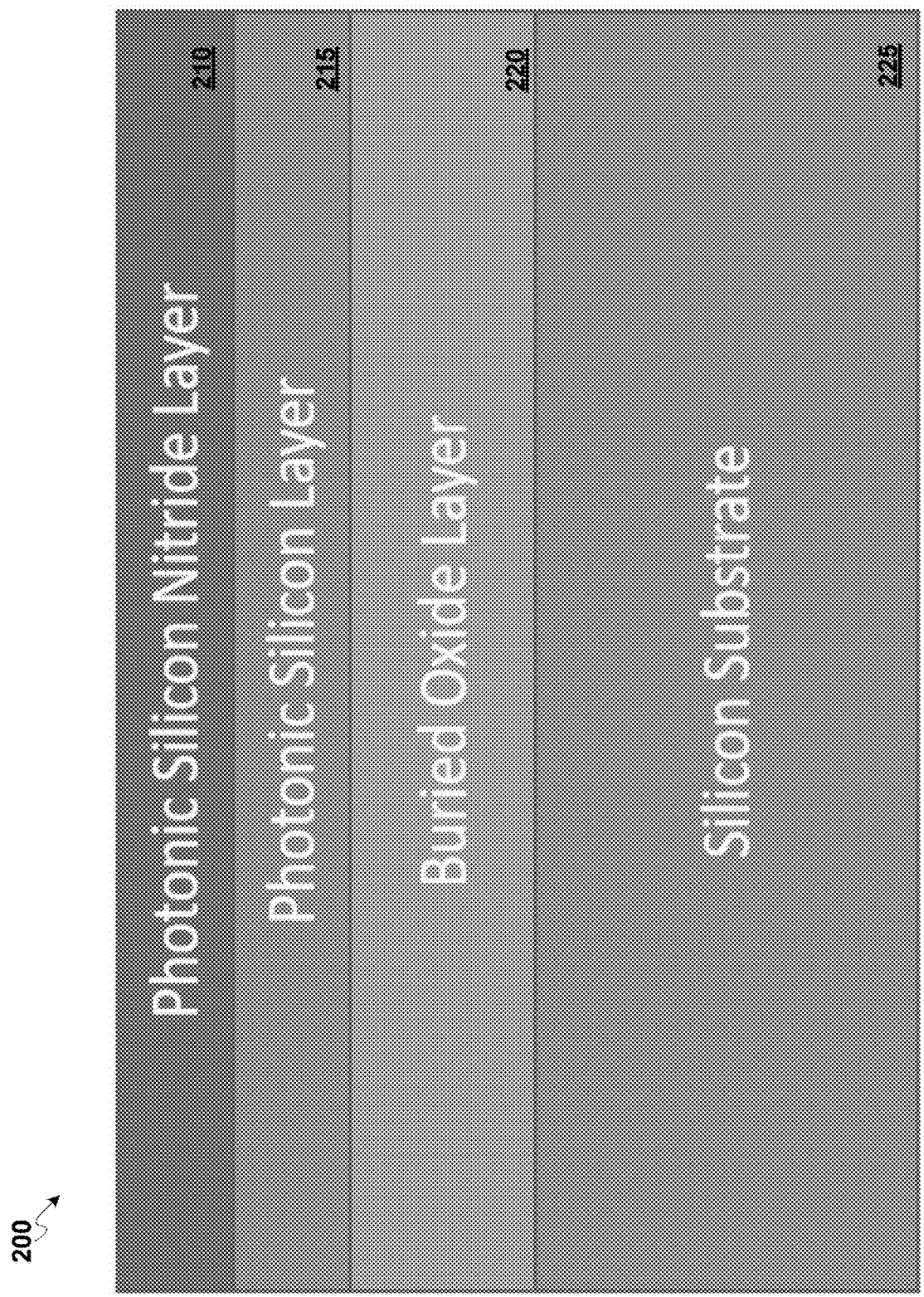
FIG. 2 depicts a cross-sectional view of an example silicon-on-insulator (SOI) wafer stack that can be used for fabricating an optical logic decision-making circuit, in accordance with the disclosure.

Referring now to FIG. 2, a cross-sectional view of a SOI wafer 200 for dual-layer optical confinement is shown. Generally, the SOI wafer 200 can comprise any suitable configuration of silicon materials and insulator materials. An SOI wafer 200 can include a layer of silicon that is separated from the bulk substrate by a thin layer of insulator, and made using existing semiconductor fabrication techniques. In an implementation, the optical logic gate decision-making circuit, as disclosed herein, uses the combined silicon nitride on SOI (also referred to herein as the nitride-on-silicon-on-insulator) wafer platform. Accordingly, the example SOI wafer 200 as shown in FIG. 2 is particularly implemented as the nitride-on-silicon-on-insulator wafer 200. The various layers of materials 210-225 that can be included to form the wafer stack of the nitride-on-silicon-on-insulator wafer 200 are illustrated.

In the illustrated example, the nitride-on-silicon-on-insulator wafer 200 includes a bulk silicon carrier substrate layer 225. For purposes of illustration, the bulk silicon carrier substrate layer 225 is described as the bottom-most layer of the wafer 200, or the underlying substrate layer, upon which the other layers, or the upper layers, are formed thereon. A buried oxide layer (BOX) 220 can comprise oxide ($SiO_2$) that is buried in the bottom-most layer of the SOI substrate, namely the bulk silicon carrier substrate layer 225. The BOX 220 serves as the insulator, and provides optical confinement for the upper silicon layers 215, 210.

An upper layer of the nitride-on-silicon-on-insulator wafer 200 that is adjacent to the BOX layer 220 is a photonic silicon layer 215. The photonic silicon layer 215 can comprise a film of silicon (Si) material forming an optical waveguide. As shown, the photonic silicon layer 215 can be disposed on top of the BOX layer 220, thereby separating the semiconductor silicon material of the silicon layer 215 from the substrate layer 225 by an insulator. The photonic silicon layer 215 (e.g., employing silicon as a main fabrication element) enables the wafer 200 to be configured as a material platform from which photonic integrated circuits (PICs) can be made. Lastly, a photonic silicon nitride layer 210 can be formed on top of the photonic silicon layer 215. The photonic silicon nitride layer 210 can be comprised of a silicon nitride ($Si_3N_4$) material that is added on top of the silicon layer 215. Thus, the photonic silicon nitride layer 210 provides another optical waveguide layer above the silicon in the photonic silicon layer 215. The air to silicon nitride interface, formed due to the silicon nitride layer 210 being the upper most layer of the nitride-on-silicon-on-insulator wafer 200, provides the optical confinement above the wafer 200. In this manner, two different optical waveguide layers are provided in the nitride-on-silicon-on-insulator wafer 200 that can be utilized for building photonic integrated circuits, both in the silicon (of the photonic silicon layer 215) and the silicon nitride (of the photonic silicon nitride layer 210). The primary non-linear effect for nitride is the Kerr effect, which operates in the micro-second regime, which sets the operating principle of the disclosed circuit to fast operating speeds, for example supporting operational speeds in MHz.

Figure 3:
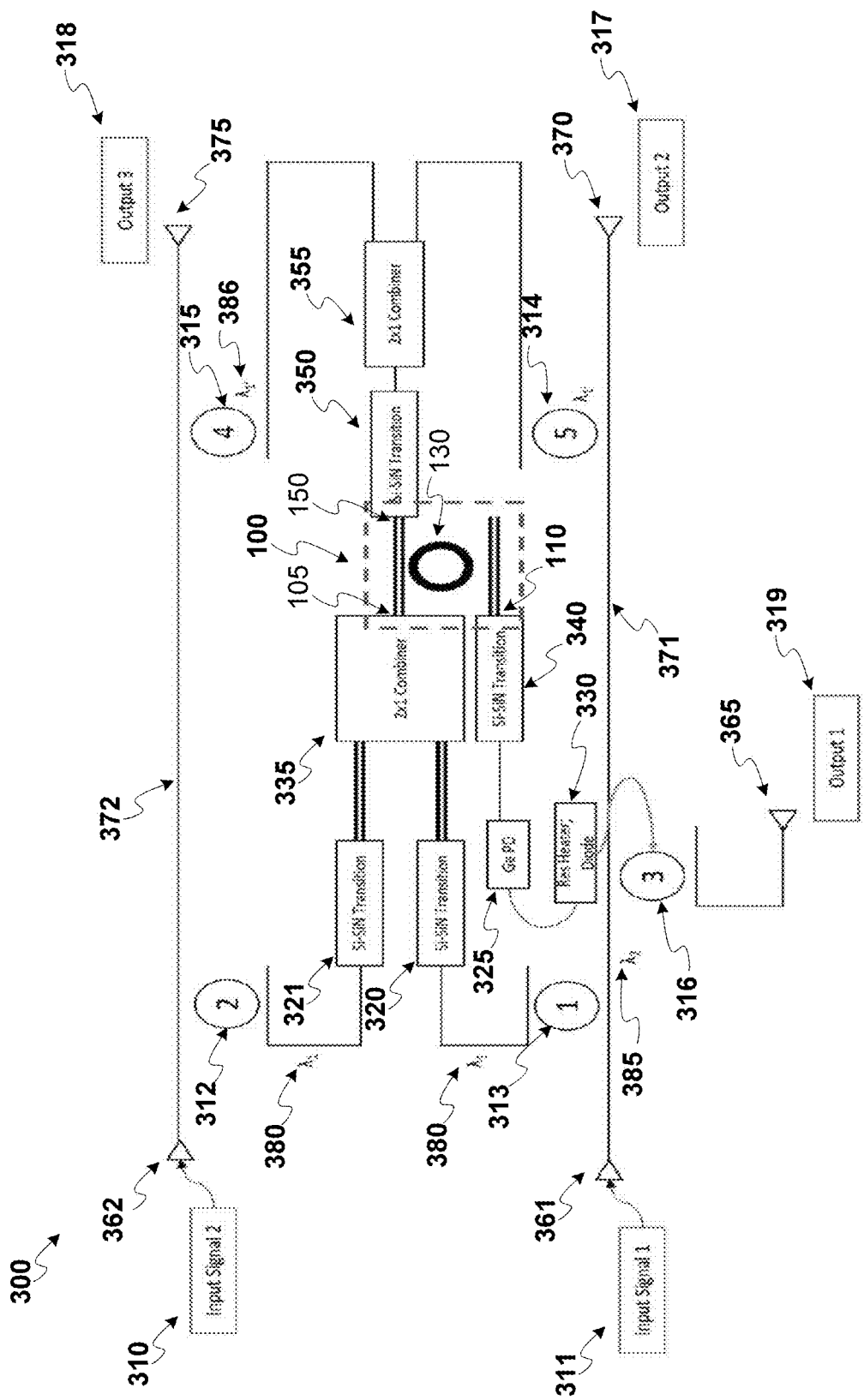
FIG. 3 depicts an example configuration for circuitry implementing an optical logic decision-making circuit including the silicon-based ring cavity filter shown in FIG. 1, in accordance with the disclosure.

FIG. 3 illustrates an example configuration of circuitry 300 for implementing the optical logic gate decision-making circuit, as disclosed herein. Accordingly, the circuitry 300 is shown to include an optical logic gate 100 (indicated by the dashed box). This optical logic gate 100 can be structurally and functionally similar to the silicon-based ring cavity filter, as described in detail above with reference to FIG. 1. Further, the optical logic gate 100 can be implemented in the silicon nitride layer of the wafer stack described above in reference to FIG. 2.

In FIG. 3, the circuitry 300 is configured to include: a lower optical bus waveguide 371 having a port 361 for receiving a first input signal 311 and a port 370 for a second output; an upper optical bus waveguide 372 having a port 362 for receiving a second input signal 310 and a port 375 for an third output; a plurality of ring cavities 312-316; a plurality of Si—SiN transitions 320, 321, 340, and 350; a plurality of 2X1 combiners 335, 355; a resistive heater 330; a photodetector 325; and the optical logic gate 100 that includes a ring cavity 130. As seen, a first ring cavity 313 is coupled to a Si—SiN transition 320, where the output of the Si—SiN transition 320 serves as an input to the 2X1 combiner 335. A second ring cavity 312 is coupled to a Si—SiN transition 321, where the output of the Si—SiN transition 321 serves as another input to the 2X1 combiner 335. A third ring cavity 316 is coupled to a port 365 for a first output 319. The third ring cavity 316 is also coupled to the resistive heater 330. The resistive heater 330 also has a terminal that is connected to the photodetector 325. Further, the photodetector 325 is coupled to the Si—SiN transition 340. The optical logic gate 100 has a bus waveguide that is coupled to both the 2X1 combiner 335 via the input port 105 and the Si—SiN transition 350 via the crop port 110, and another bus waveguide that is coupled to the Si—SiN transition 340 via the thru port 150. A fourth ring cavity 315 and a fifth ring cavity 314 are both coupled to terminals of the 2X1 combiner 355.

As an example of operation, the ring cavity 130 of the optical logic gate 100 can have an intrinsic resonance wavelength of 1310 nm ($\lambda_{intrinsic\_resonance}$=1310 nm) and its input port 105 coupled to a lossless 2x1 optical combiner 335. The 2x1 optical combiner 335 can be configured for adding the field intensities of two separate optical input signals, at the same wavelength, into one output optical signal. Two optical inputs of the 2x1 optical combiner 335 are shown in FIG. 3 as "input signal 1" 311 and "input signal 2" 310. If the "input signal 1" 311 has a field intensity X at 1310 nm (X=1310 nm) and the "input signal 2" 310 has zero field intensity (Y=0), then the "input signal 1" 311 will get routed to the drop port 110 of the optical logic gate 100 as it is on-resonance with the ring cavity 130 (i.e., X=1310 nm, $\lambda_{intrinsic\_resonance}$=1310 nm, and X=$\lambda_{intrinsic\_resonance}$). Thus, if one observes the signal from the thru port 150 of the optical logic gate 100 (i.e., the silicon-based ring cavity filter), they will see an optical "0". The same is true in an example operation where the "input signal 1" 311 has a zero field intensity (X=0) and "input signal 2" 310 has a non-zero field intensity (Y≠0). That is, since the "input signal 1" 311 is not on-resonance with the ring cavity 130 (i.e., X=0, $\lambda_{intrinsic\_resonance}$=1310 nm, and X≠$\lambda_{intrinsic\_resonance}$), then the "input signal 1" 311 will get routed to the thru 150 port of the optical logic gate 100. As a result, the signal will similarly be observed as an optical "0" from the thru port 150 of the optical logic gate 100 (i.e., the silicon-based ring cavity filter).

Continuing with another example, "input signal 2" 310 may have a field intensity of Y at 1310 nm (Y=1310 nm). If the sum of these field intensities (e.g., 2X1 combiner 335 adding the field intensities of "input signal 1" 311 at X and "input signal 2" 310 at Y) corresponding to "input signal 2" 310 and "input signal 1" 311, X and Y respectively, are above a threshold for the onset of optical non-linear effects, this will cause the index of refraction of the ring cavity 130 to change. The aforementioned change of the index of refraction, can cause the wavelength of resonance of the ring cavity 130 to no longer be at the intrinsic value, which is 1310 nm in the example. Therefore, the observed output at the thru port 150 will now be an optical "1". In this manner, if both "input signal 1" 311 and "input signal 2" 310 are an optical "1", the thru port 150 output will also be an optical "1", hence functioning as an optical AND gate. Furthermore, by observing the drop port 110 only of the optical logic gate 100 (i.e., the silicon-based ring cavity filter), the device behaves like an exclusive OR (XOR) gate. For instance, if "input signal 1" 311 or "input signal 2" 310 are at an optical "1", the drop port 110 will also show an optical "1" and show an optical "0" when both input signal 1" 311 or "input signal 2" 310 are at an optical "1". The key behavior of such a device is that there are no electronic signals required to enable this logic functionality, as the optical logic date decision-making circuit 300 relies substantively on the optical non-linearity and input field intensities.

The optical logic gate decision-making circuit 300 assumes two separate input signals, each comprised of two time-dependent wavelength signals. For example, $\lambda_1$ 380 can be assumed as the control signal and $\lambda_2$ 385 can be assumed as the data signal. As "input signal 1" 311 is injected into the circuit 300, $\lambda_1$ 380 is routed through the first ring cavity 313 and $\lambda_2$ 385 propagates to the right, and traversing lower optical bus waveguide 371. As $\lambda_1$ 380 is routed upwards, it passes through a silicon-to-silicon nitride waveguide transition layer (Si—SiN Transition) 320 as it moves from the silicon waveguide layer to the silicon nitride waveguide layer of the wafer material stack. It is then injected into the 2x1 combiner 335 discussed above. Similarly, $\lambda_1$ 380 from "input signal 2" 310 is also filtered, being routed through the second ring cavity 312. Subsequently, the $\lambda_1$ 380 from "input signal 2" 310 is routed into the same 2x1 combiner 335 by the second ring cavity 312.

The drop port 110 of the optical logic gate 100 is routed through a silicon-to-silicon nitride transition (Si—SiN Transition) 340 and into a photodetector (Ge PD) 325 which converts the received optical signal into an electrical signal. This electrical signal then biases a resistive heater 330 (or diode) that can be integrated in the silicon-based third ring cavity 316. As a consequence of applying heat produced by the resistive heater 300, a thermal-induced shift of the previously-calibrated wavelength of resonance in the third ring cavity 316 can be caused.

The thru port 150 of the optical logic gate 100 is routed through another silicon-to-silicon nitride transition (Si—SiN Transition) 350 and 1x2 splitter 355 (shown in FIG. 3 as the 2x1 combiner 355 in reverse) and added back to the upper optical bus waveguide 372 and lower optical bus waveguide 371. This capability means that downstream optical logic circuits can still use this wavelength for further decision-making actions. Hence the non-destructive capability of this circuit. It should be noted that an added wavelength, $\lambda'_1$ 386 can be considered as a logical result of an AND operation on the as-injected $\lambda_1$ 380 from the two input signals "input signal 1" 311 and "input signal 2" 310.

In the embodiments, the "optical input signal 1" 311 and "optical input signal 2" 310 are synchronized in time, such that $\lambda_1$ 380 for both input signals 310, 311 are the same wavelength. Referring back to the previously described example, $\lambda_1$ 380 can be at 1310 nm for both the "optical input signal 1" 311 and the "optical input signal 2" 310. In a condition where only one of the $\lambda_1$ 380 signals is at an optical "1", it will be on-resonance for the optical logic gate 100 and routed through the drop port 110 and into the photodetector (Ge PD) 325. Then, the electrical signal that is output from the photodetector (Ge PD) 325 can bias the resistive heater (or diode) 330 in the third ring cavity 316 and maintain its wavelength of resonance to match $\lambda_2$ from "input signal 1" 311, which can be observed at "optical output 1" 319.

If both $\lambda_1$ 380 of the "input signal 1" 311 and "input signal 2" 310 are 0, then there is no light seen through the optical logic gate 100 and the third ring cavity 316 will be off-resonance. Also, the $\lambda_2$ 385 will be observed through "optical output 2" 317. If both $\lambda_1$ 380 of the input signals is an optical "1", then the optical logic gate 100 will show a "0" at the drop port 110 and not bias the third ring cavity 316 and the thru port 150 of the optical logic gate 100 will show an optical "1", which will be added back to the two bus waveguides 371, 372 for downstream use.

As previously described, it can be assumed that $\lambda_2$ 385 of the two input signals "input signal 1" 311 and "input signal 2" 310 is carrying high-speed data. Therefore, the disclosed optical logic gate decision-making circuit 300 can make routing decisions on how $\lambda_2$ 385 can be routed, between "output 1" 319 and "output 2" 317, as a function of time in real-time data flow. In effect, $\lambda_1$ 380 for the two input signals 310, 311 is a packet header that determines the routing decision of $\lambda_2$ 385. In this way, contention can be avoided, the need for optical buffers precluded, and real-time routing decisions enabled. However, since the third ring cavity 316 is a silicon-based cavity, it can also be used to encode data on a desired wavelength. Therefore, the optical logic decision-making circuit 300 can be used as a wavelength switch as well, where in one state the data is encoded on $\lambda_2$ 385 of "input signal 1" 311 and in another state, it is used to encode data on a third A (not shown) as injected by an input signal.

In this manner, as alluded to above, the drop port 110 of the optical logic gate 100 is configured to function as an exclusive OR (XOR) operation, and the thru port 150 of the optical logic gate 100 is configured to function as an AND operation. FIG. 4 shows a truth table 400 representing examples of the logical operations performed by the disclosed optical logic gate decision-making circuit 300 in FIG. 3.

Referring to FIG. 4, the truth table 400 illustrates: examples of values for $\lambda_1$ of input 1 of the optical logic gate decision-making circuit ($\lambda_1^1$) 410; examples of values for $\lambda_1$ of input 2 of the optical logic gate decision-making circuit ($\lambda_1^2$) 420; examples of values observed at thru port of the logic gate (Logic Gate THRU) 430; examples of values observed at drop port of the logic gate (Logic Gate DROP) 440; examples of values for output 1 of the optical logic gate decision-making circuit (Output 1) 450; and examples of values for output 2 of the optical logic gate decision-making circuit (Output 2) 460.

As an example, illustrated in the truth table 400, $\lambda_1^1$ 411 can be received as input to the circuitry as an optical "0" and $\lambda_1^2$ 421 can be received as input to the circuitry as an optical "0". Thus, optical "0" will be observed at the thru port 431, and an optical "0" will be observed at the drop port 440. Further, output 1 451 will be an optical "0"; and output 2 461 will be equal to A2.

In addition, truth table 400 shows an example where $\lambda_1^1$ 412 is received as input to the circuitry as an optical "0" and $\lambda_1^2$ 422 is received as input to the circuitry as an optical "1". As a result, optical '0' will be observed at the thru port 432, and an optical "1" will be observed at the drop port 442. Further, output 1 452 will be $\lambda_2$ and output 2 462 will be equal to an optical "0".

Truth table 400 also shows another example where $\lambda_1^1$ 413 is received as input to the circuitry as an optical "1" and $\lambda_1^2$ 423 is received as input to the circuitry as an optical "0". As a result, optical "0" will be observed at the thru port 433, and an optical "1" will be observed at the drop port 443. Output 1 453 will be $\lambda_2$ and output 2 463 will be equal to an optical "0".

In yet another example shown in the truth table 400, the $\lambda_1^1$ 414 is received as input to the circuitry as an optical "1" and $\lambda_1^2$ 424 is received as input to the circuitry as an optical "1". As a result, optical "1" is observed at the thru port 434, and an optical "0" is observed at the drop port 444. Output 1 454 is an optical "0" and output 2 464 is A2.

As disclosed herein, non-linear optical circuitry is implemented as a silicon nitride-based circuit that utilizes thermal non-linear effects to enable optical computing, while consuming generally low optical power levels (e.g., tens of milliwatts of optical power levels) for operation. The optical logic gate decision-making circuit has a distinct design that combines nitride and silicon-based devices into one monolithic circuit that can enable data encoding and logic. Furthermore, the disclosed circuitry takes the input of one optical device and uses it on-chip to influence another optical device. Specifically, using the photocurrent generated from an on-chip photodiode to bias a resistive heater, which is accomplished in a manner that does not require going through any co-packaged electronic chip.

Figure 5:
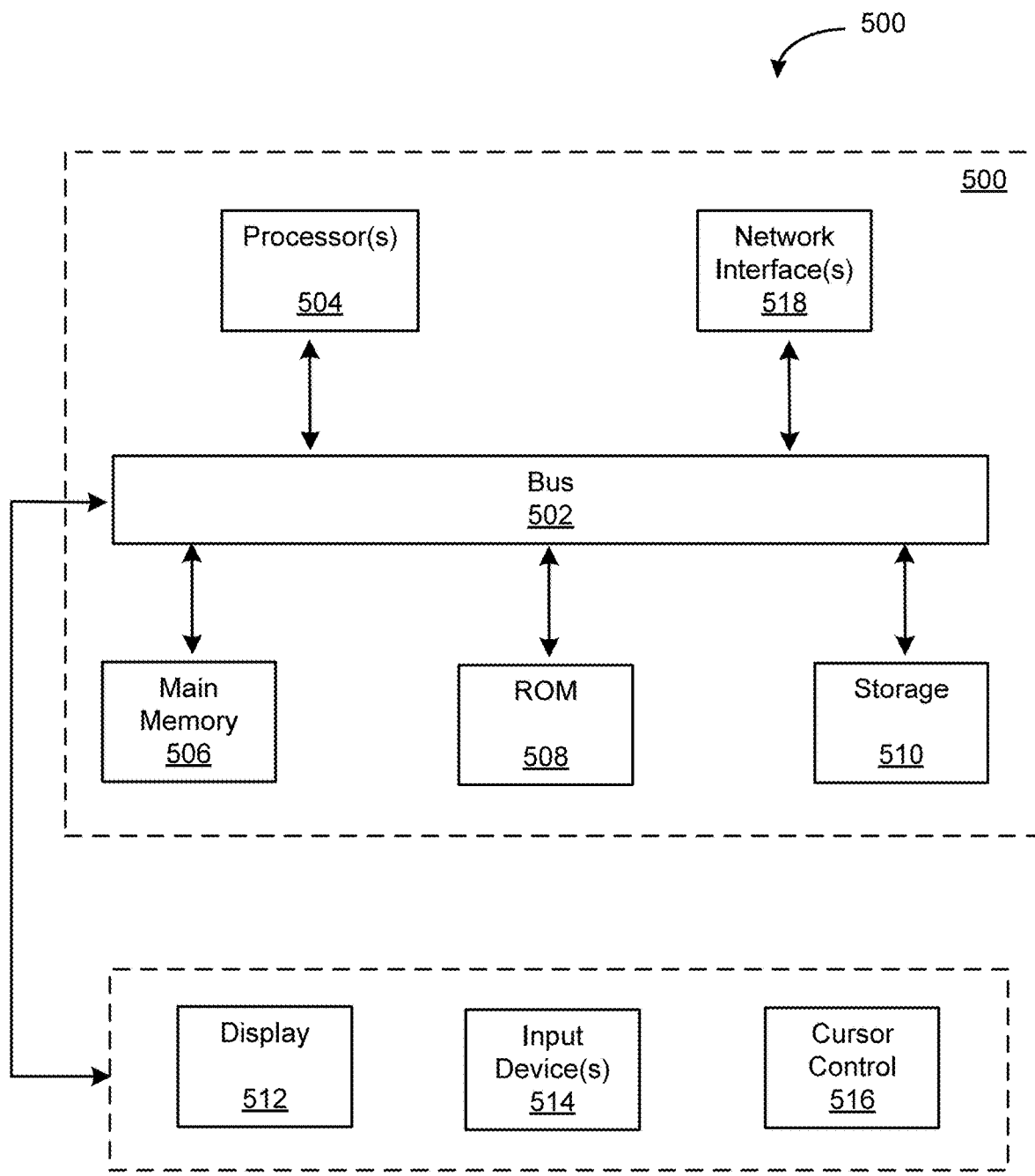
FIG. 5 is an example computing component that may be used to implement various features of embodiments described in the present disclosure.

FIG. 5 depicts a block diagram of an example computer system 500 in which various embodiments described herein may be implemented. For example, the computer system 500 may utilize high speed optical data technology, where the disclosed optical logic gate decision-making circuit can be employed to enable low latency packet switching (e.g., eliminating E/O/E conversion). The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random-access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An optical logic gate decision-making circuit, comprising:
   a silicon-on-insulator (SOI) wafer platform, the SOI wafer platform comprising non-linear materials and conductive materials combined thereon;
   a first optical bus waveguide, wherein the first optical bus waveguide comprises a first input port receiving a first input optical signal and a first output port transmitting a first optical output signal;
   a second optical bus waveguide, wherein the second optical bus waveguide comprises a second input port receiving a second input optical signal and a second output port transmitting a second optical output signal; and
   an optical logic gate circuit, comprising:
      non-linear materials and conductive materials combined such that an optical non-linearity enables an optical logic gate function:
      a silicon-based ring cavity filter;
      an input bus wave guide comprising a thru port, wherein the enabled optical logic gate function modifies the first input optical signal and the second input optical signal in accordance with a logical AND operation with respect to an output signal at the thru port; and
      an output wave guide comprising a drop port, wherein the enabled optical logic gate function modifies the first input optical signal and the second input optical in accordance with a logical excusive or (XOR) operation with respect to the output signal at the drop port.

2. The optical logic gate decision-making circuit of claim 1, wherein modifying the first input optical signal and the second input optical signal in accordance with a logical AND operation with respect to the output signal at the optical thru port, comprises:
   receiving the first input optical signal at a field intensity that is equal to the resonant wavelength of the silicon-based ring cavity filter and the second input optical signal at a field intensity that is equal to zero; and
   the silicon-based ring cavity filter routing the first input optical signal to the drop port and modifying the first input optical signal to a have a field intensity that is equal to a logical "0" at the thru port.

3. The optical logic gate decision-making circuit of claim 1, wherein modifying the first input optical signal and the second input optical signal in accordance with a logical AND operation with respect to the output signal at the optical thru port, comprises:
   receiving the first input optical signal at a field intensity that is equal to zero and the second input optical signal at a field intensity that is non-zero; and
   the silicon-based ring cavity filter routing the first input optical signal to the thru port such that the first input optical signal has a field intensity that is equal to a logical "0" at the thru port.

4. The optical logic gate decision-making circuit of claim 1, further comprising a 2X1 adder receiving the first input optical signal and the second input optical signal, and wherein modifying the first input optical signal and the second input optical signal in accordance with a logical AND operation with respect to the output signal at the optical thru port, comprises:
   receiving the first input optical signal at a field intensity that is equal to the resonant wavelength of the silicon-based ring cavity filter and the second input optical signal at a field intensity that is also equal resonant wavelength of the silicon-based ring cavity filter; and
   the silicon-based ring cavity filter receiving the sum of the field intensity of the first optical wavelength and the field intensity of the second optical wavelength from the 2X1 adder such that the optical non-linearity modifies the resonant wavelength of the silicon-based ring cavity filter; and
   modifying the first input optical signal to a have a field intensity that is equal to a logical "1" at the thru port.

5. The optical logic gate decision-making circuit of claim 1, wherein modifying the first input optical signal and the second input optical signal in accordance with a logical XOR operation with respect to the output signal at the drop port, comprises:

receiving the first input optical signal at a field intensity that is equal to the resonant wavelength of the silicon-based ring cavity filter and the second input optical signal at a field intensity that is equal to zero; and the silicon-based ring cavity filter routing the first input optical signal to the drop port such that the first input optical signal has a field intensity that is equal to a logical "1" at the drop port.

6. The optical logic gate decision-making circuit of claim 1, wherein the first input optical signal and the second input optical signal are each comprised of a first time-dependent wavelength signal $\lambda_1$ that is a control signal and a second time-dependent wavelength signal $\lambda_2$ that is as data signal.

7. The optical logic gate decision-making circuit of claim 6, enabling routing decisions for routing the second time-dependent wavelength signal $\lambda_2$ between the first output port and the second output port as a function of time in real-time data flow, and enabling the first time-dependent wavelength signal $\lambda_1$ as a packet header that determines the routing decisions.

8. The optical logic gate decision-making circuit of claim 1, wherein the non-linear materials and conductive materials comprise a combination of silicon nitride on the SOI wafer platform.

* * * * *